UNITED STATES PATENT OFFICE.

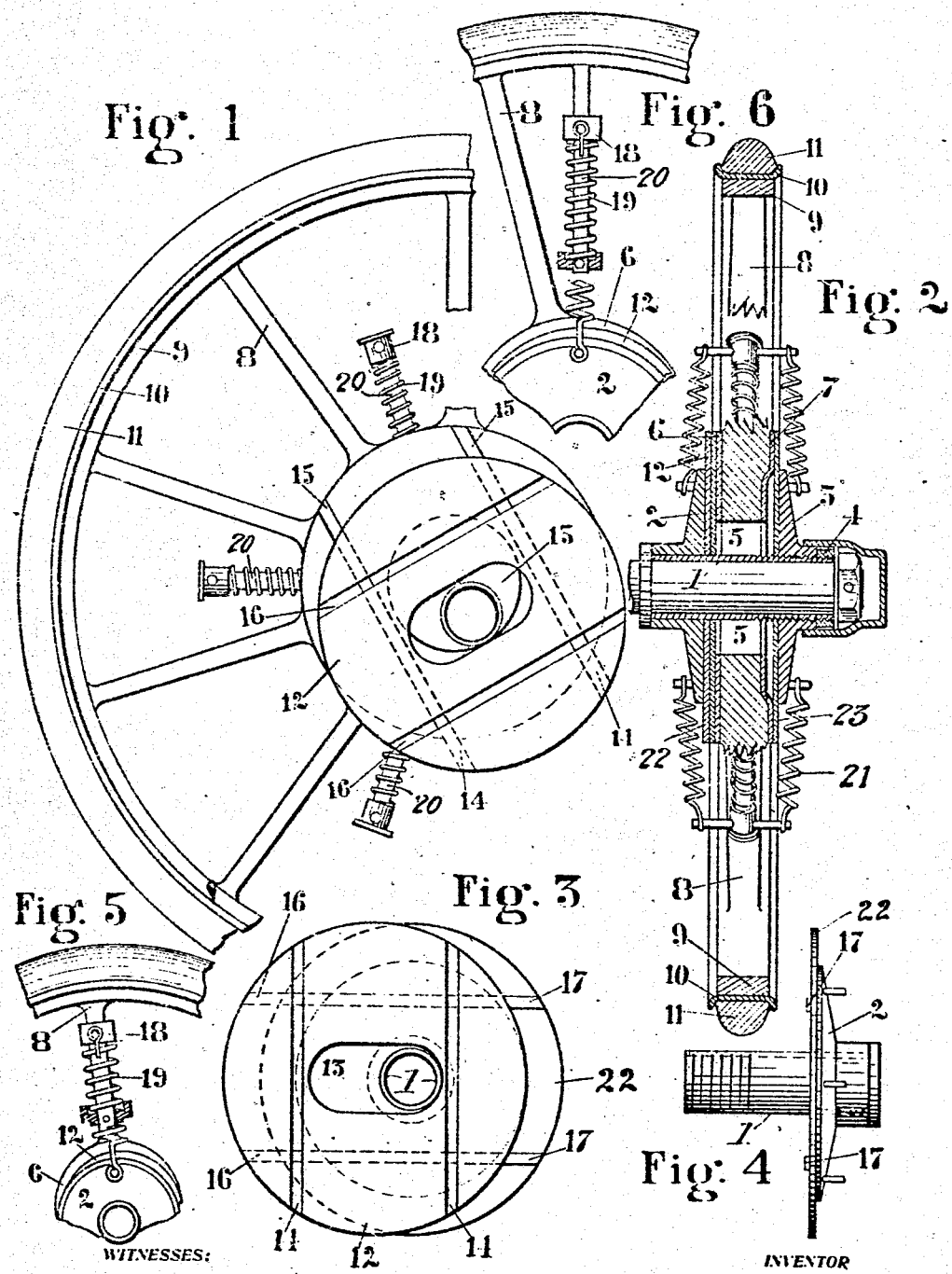

ALFRED MOORE, OF DETROIT, MICHIGAN.

SPRING-WHEEL.

975,630.  Specification of Letters Patent.  Patented Nov. 15, 1910.

Application filed August 22, 1908. Serial No. 449,757.

*To all whom it may concern:*

Be it known that I, ALFRED MOORE, a citizen of the United States of America, residing at Detroit, in the county of Wayne and State of Michigan, have invented certain new and useful Improvements in Spring-Wheels, of which the following is a specification, reference being had therein to the accompanying drawings.

This invention relates to spring wheels for vehicles and consists in the matters hereinafter set forth, and more particularly pointed out in the appended claim.

In the drawings, Figure 1 is a view in side elevation, with parts broken away, of a wheel embodying features of the invention. Fig. 2 is a view in vertical section, partially broken away, of a wheel embodying the invention. Fig. 3 is a view in detail of a main hub flange and the slide plate. Fig. 4 is a view in detail of the main hub. Fig. 5 is a view in detail showing a modified arrangement of spring members of the wheel. Fig. 6 is a view of another arrangement of the springs.

Referring to the drawings, 1 indicates a main hub provided at one end with a wide, fixed flange 2 and at the other with a detachable flange 3 secured in any preferred adjustable manner, as by being screw-threaded on to the hub end with a follower or check nut 4, whereby it may be held in any desired relation to the fixed flange.

A floating or movable hub 5 having an enlarged central aperture, encircles the fixed hub between the flanges of the latter. This hub may be built up like the navel of any wheel of conventional design provided with metallic end or face plates 6 and 7 corresponding substantially to the enlarged portions or disks 22, 23 secured to the hub flanges 2, 3, spokes 8, felly 9, rim 10 and tire 11, all of standard construction, completing the wheel body.

A friction slide plate 12, preferably conforming in size to the enlarged portion of the flange 2 is interposed between this flange and the adjacent hub face plate 6, an elongated slot 13 permitting its oscillation on the hub. It is locked with the adjacent hub flange to reciprocate in one direction only thereon and with the contacting face plate to slide thereon at right angles to its motion on the flange. Any suitable means for accomplishing this result may be used.

In a preferred form of construction, two or more parallel guide grooves 14 in one side of the slide are engaged by mating ribs or lugs 15 on the opposing surface of the adjacent face plate and similar slots 16 on the other side of the plate at right angles to the grooves 14 likewise engage ribs 17 on the disk 22. This permits free oscillation of the wheel navel in the hub, limited only by the play of the latter in the apertures, and by the frictional engagement of the contacting surfaces, while the hub and navel are positively locked to rotate in unison.

Radially disposed main springs 21 are secured at their inner ends to the hub flanges, preferably near the rims thereof, and their outer ends are connected as by collars 18 to the outer ends of auxiliary springs 19. Either the spokes 8 act as keepers for the auxiliary springs, as in Fig. 5, or else radial guide arms 20 extending from the felly, as in Fig. 6, or in the preferred form disclosed in Fig. 1, extending from the navel, are provided, the collars sliding thereon. As herein shown, the main springs are preferably disposed in pairs. The auxiliary springs are so disposed and adjusted as to close together and act as ferrules when the weight or load tends to stretch the main springs, and thus to act as rigid struts between the main springs and hub, while they expand and prevent buckling of the main springs when the latter are compressed by the load during a portion of the revolution of the wheel. Obviously, any number of main springs may be used, according to the work to be done.

In use, the wheel may be made more or less resilient to accommodate different conditions of service, by setting the adjusting flange so as to increase or decrease the friction between the slide and adjacent parts which thereby act as shock absorbers to help resist abnormal stresses.

In addition to the advantage of the positive interlocking of the parts for transmission of torsional strain, the taking up of the slack of the main springs when they would ordinarily be compressed, permits the use of a very close coil main spring as the latter cannot be compressed but is under tension at all times.

Obviously, changes in the details of construction may be made without departing from the spirit of the invention and I do not care to limit myself to any particular form or arrangement of parts.

What I claim as my invention is:—

A spring wheel having a main hub, a floating hub encircling the main hub, means in sliding frictional engagement with each hub adapted to lock the hubs positively to turn together and to permit oscillation of one on to the other, adjusting means for changing the degree of friction between the interlocking means and the hubs, pairs of radially disposed main springs secured at their inner ends to the main hub, and radially disposed auxiliary springs between the main springs secured at their inner ends to the floating hub and at their outer ends to the main springs.

In testimony whereof I affix my signature in presence of two witnesses.

ALFRED MOORE.

Witnesses:
C. R. STICKNEY,
A. M. DORR.